UNITED STATES PATENT OFFICE.

ERNEST AUGUSTUS MEBUS AND JACOB WILLIAM DE CASTRO, OF NEW YORK, N. Y.

MANUFACTURE OF CARBONATE OF STRONTIUM.

SPECIFICATION forming part of Letters Patent No. 301,383, dated July 1, 1884.

Application filed October 23, 1883. (No specimens.)

*To all whom it may concern:*

Be it known that we, ERNEST AUGUSTUS MEBUS and JACOB WILLIAM DE CASTRO, both of New York city, county of New York, and State of New York, have invented certain new and useful Improvements in the Manufacture of Carbonate of Strontium from Sulphate of Strontium, of which the following is a full, true, and exact description.

Carbonate of strontium has hitherto been obtained from sulphide of strontium, which was produced from the natural sulphate of strontium by reducing the same by means of a great heat and a reducing substance. We have ascertained that the conversion of the sulphate of strontium into carbonate of strontium may be almost completely and more economically effected directly by means of carbonate of ammonium, or by ammonia and carbonic acid, if the sulphate of strontium is in a very finely divided state. We have further ascertained that ordinary gas-water can be employed for the manufacture, and that either sulphate of ammonium of a high degree of purity can be obtained as a very valuable by-product, or that the same ammonia can be used over again in the manufacture as often as desired.

To carry out our invention in practice, we proceed in the following manner: We dry the sulphate of strontium, if necessary, then crush and grind it to such a degree of fineness that it will pass at least through an eighty-mesh sieve, but prefer to use down to a two-hundred-mesh sieve. We then mix the ground sulphate of strontium with water and carbonate of ammonium, or caustic ammonia, or a mixture of carbonate of ammonium and caustic ammonia, and pass carbonic acid through the mixture, if it does not already contain a sufficient quantity of the same. As a source of ammonia, ordinary gas-water, or gas-water condensed by distillation, may be employed. We prefer to regulate our mixtures so as to contain for every one hundred parts of sulphate of strontium twenty parts of ammonia, twenty-six parts of carbonic acid, and from five hundred to one thousand parts of water. The mixture, prepared as above, is then agitated for a period of about twenty-four hours. This period, however, may be considerably shortened, if the sulphate of strontium is sufficiently finely ground. After the agitation the sulphate of strontium is converted into carbonate of strontium by the action of the carbonate of ammonium, or of the ammonia and carbonic acid. It is then separated from the liquid, washed, and dried, after which it is ready for sale. The conversion may be carried out at various temperatures and under various pressures; but we prefer not to employ artificial heat, cold, or pressure. The liquid obtained, together with the washing-water from the carbonate of strontium, contains sulphate of ammonium and carbonate of ammonium. This liquid is then distilled to recover the carbonate of ammonium. The remaining solution of sulphate of ammonium is then either evaporated to the crystallizing-point of sulphate of ammonium, cooled, and crystallized to obtain sulphate of ammonium for commerce, or it is distilled with lime to recover the ammonia, which may be used over again for the conversion of fresh quantities of sulphate of strontium into carbonate. In the first case we obtain a highly valuable by-product—viz., sulphate of ammonium—and save the sulphuric acid usually employed in its manufacture. In the second case the same quantity of ammonia originally employed can convert theoretically an unlimited quantity of sulphate of strontium. In practical working, however, there is a small loss of ammonia, which must be replenished from time to time. With proper care in the manufacture this loss does not exceed three pounds of sulphate of ammonium for every one hundred pounds of carbonate of strontium produced.

We are aware that the conversion of sulphate of strontium into carbonate by the use of carbonate of ammonium is not new; and we make no claim to such process, broadly. We are also aware that the sulphate of strontium has been converted into the carbonate of strontium after it has been roasted in order to be converted into the sulphide; but by our process no such step is necessary, and we are enabled to produce the carbonate without such process.

What we claim as our invention, and desire to secure by Letters Patent, is—

1. The process of converting sulphate of strontium into carbonate of strontium, which consists in reducing said sulphate of strontium into an exceedingly fine condition, in mixing it with sufficient water to maintain it in suspension therein, and in treating it with carbonate of ammonium or ammonia and carbonic acid, substantially as described.

2. The process of converting sulphate of strontium into carbonate of strontium, which consists in reducing said sulphate of strontium into an exceedingly fine condition, in mixing it with sufficient water to maintain it in suspension therein, and in treating it with gas-water, substantially as described.

3. The process of converting sulphate of strontium into carbonate of strontium without the material loss of the converting agent, which consists in reducing the sulphate of strontium into an exceedingly fine condition, in mixing it with sufficient water to maintain it in suspension therein, and in treating it with carbonate of ammonia, or ammonia and carbonic acid, thereby producing carbonate of strontium and sulphate of ammonia, recovering the ammonia from the sulphate of ammonia by distillation with lime, substantially as described.

ERNEST AUGUSTUS MEBUS.
JACOB WILLIAM DE CASTRO.

Witnesses:
GEO. H. EVANS,
WM. A. POLLOCK.